UNITED STATES PATENT OFFICE.

ALBERT LOUIS KREISS, OF MERRIMAN, NEBRASKA.

PROCESS FOR THE PRODUCTION OF PHOSPHATE FERTILIZER CONTAINING POTASSIUM.

1,366,569.     Specification of Letters Patent.     Patented Jan. 25, 1921.

No Drawing.     Application filed July 30, 1920. Serial No. 400,286.

*To all whom it may concern:*

Be it known that I, ALBERT LOUIS KREISS, a citizen of the United States of America, and a resident of Merriman, in the county of Cherry and State of Nebraska, have invented or discovered a new and useful Improved Process for the Production of Phosphate Fertilizer Containing Potassium.

The invention is a novel process or method for the conversion of insoluble phosphate rock and potassium bearing silicate rock, particularly leucite rock to soluble and available phosphate and potassium.

Innumerable attempts have been made to convert phosphate and potassium so as to make them available but the very elaborate and expensive means or method involved have rendered them inoperative and impracticable. This method or process is orderly, simple in its operation, practicable in its application, and efficient in its accomplished purpose.

The invention may be described in brief as consisting of an intimate mixing of crude phosphate rock with potassium bearing silicate rock and a suitable alkali-metal salt, the subjection of such mixture to heat, thereby calcining the said mixture, and the separation of the soluble and the insoluble compounds in the ordinary or suitable manner.

In the practical operation of the invention a definite amount of phosphate rock is intimately and thoroughly mixed with one-half the amount of potassium-bearing silicate or other insoluble potassium bearing rock and sodium or potassium sulfate or carbonate or any other suitable alkali-metal salt, as for example:

| | Parts. |
|---|---|
| Phosphate rock | 1 to 2 |
| Potassium bearing silicate | $\frac{1}{2}$ to 1 |
| Sodium sulfate | $\frac{1}{2}$ to 1 |

The said mixture is then placed in a rotary drier or stationary furnace and calcined by means of direct or indirect heat from a reducing flame. The mass of soluble and insoluble compounds is then subjected to the ordinary or a suitable method of separation with the final yield, as resultant products, of available phosphoric acid $P_2O_5$ and soluble potash $K_2O$.

A mixture of all four of the alkali-metal salts mentioned or of any four suitable ones in the amount of one-half of the phosphate rock may be used. A treatment of the four alkali-metal salts mentioned with the phosphate rock and potassium bearing silicate would be expressed in the following proportion:

| | Parts. |
|---|---|
| Phosphate rock | 1 to 2 |
| Potassium bearing silicate | $\frac{1}{2}$ to 1 |
| Sodium sulfate | |
| Potassium carbonate | $\frac{1}{2}$ to 1 |
| Sodium carbonate | |
| Potassium sulfate | |

The result of such treatment would yield a mixture of insoluble silicate, insoluble calcium sulfate and soluble potassium carbonate or soluble sulfate, and citrate soluble dicalcium sodium or potassium phosphate and soluble sodium phosphate and soluble potassium phosphate. The components used may be varied in an increased or decreased amount, providing that there is a sufficient amount of the alkali-metal salt used to equal the molecular equivalent weight required to combine with all the potassium in the silicate or other insoluble potassium bearing rock and with one-third of the amount of phosphoric acid present in the phosphate rock. The proper proportions of the alkali-metal salt or salts used will to a large extent depend upon the compositions of the silicate or other potassium-bearing rock, and on the phosphate rock, undergoing treatment.

A thorough mixture of the ingredients is an essential step and constitutes an important part of the invention. Direct or indirect heat may be applied in the calcining and the result obtained will be materially affected by the use of heats differing both as to degree and nature. The resultant mass or mixture after calcining need not be subjected to a leaching or other method of separation of the soluble and insoluble compounds remaining but may be applied to the soil after crushing or other suitable preparation, alone or in combination with some other compound or ingredient.

This process or method renders both phosphate rock and potassium bearing silicate or other potassium bearing rock to a soluble state in one operation and nearly all of the soluble and available phosphate and potassium contained therein is rendered fit for commercial use by the one treatment. Further treatment having for its object the separation of any impurities remaining might be resorted to, but the one treatment as herein described produces at one and the same time a superior result to that obtained by kindred methods and accomplishes such result in a much more simple and efficient manner than that of any known process or method.

While the preferred embodiment of the process or method has been set forth a wide latitude as to the use and proportion of ingredients and the inclusion of added steps will not operate to depart from the true spirit of the invention.

Having thus described my invention or discovery, what I claim as new and desire to secure by Letters Patent is:—

1. The herein described process which includes the mixing of material containing an insoluble potassium compound with phosphate containing material and more than one alkali metal salt and calcining the mixture to produce a conversion of the insoluble phosphates and the potassium compound to available phosphoric acid and a soluble potassium compound.

2. The method of producing a fertilizer which consists in intimately mixing phosphate rock with potassium bearing silicate or other potassium bearing rock and two or more different alkali-metal salts and calcining said mixture.

3. The method of producing a fertilizer which consists in mixing phosphate rock with potassium bearing rock and more than one alkali metal salt, calcining the said mixture, and leaching.

ALBERT LOUIS KREISS.